June 14, 1966    I. PEYCHES ET AL    3,256,081
MANUFACTURE OF FLAT GLASS
Filed Nov. 19, 1963      4 Sheets-Sheet 1
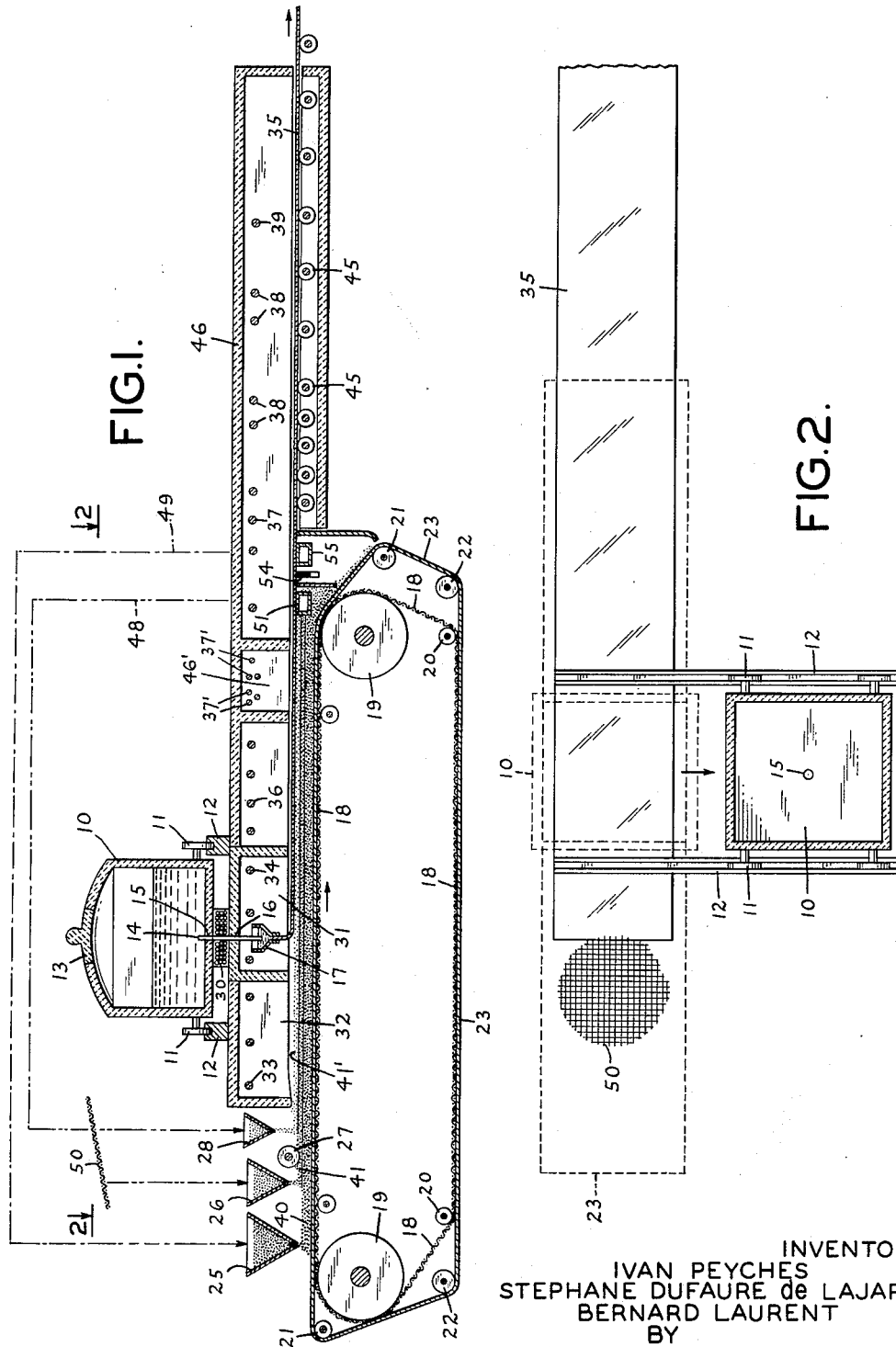
INVENTORS:
IVAN PEYCHES
STEPHANE DUFAURE de LAJARTE
BERNARD LAURENT
BY
Bauer and Seymour
ATTORNEYS

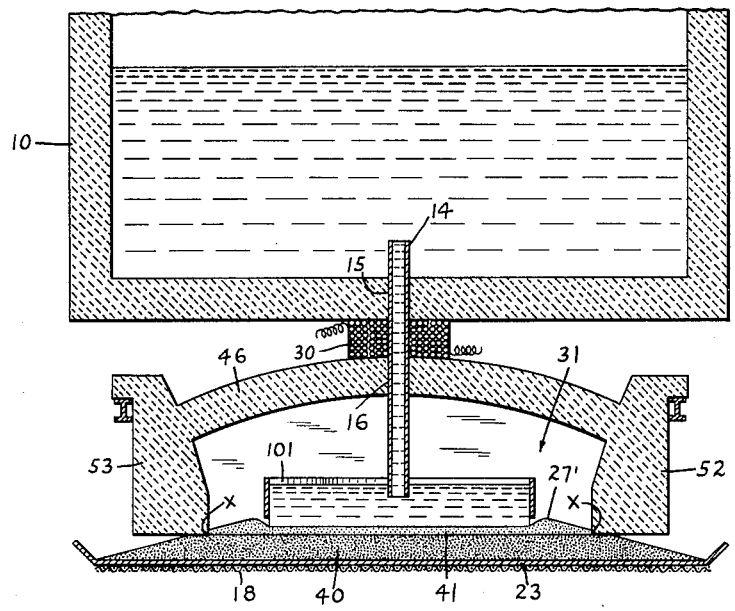
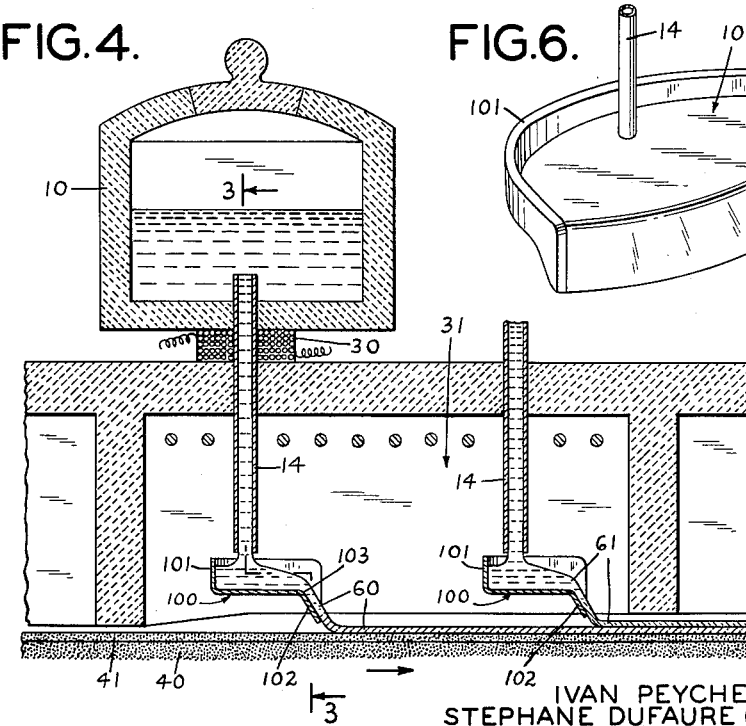

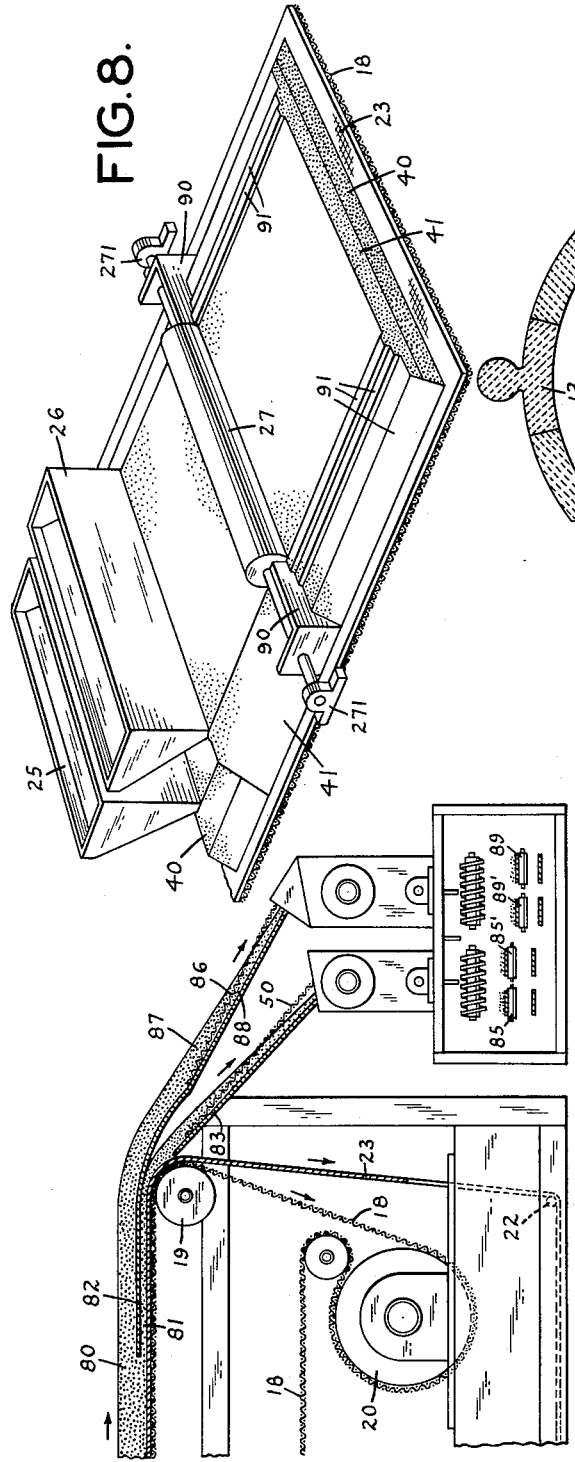

United States Patent Office 3,256,081
Patented June 14, 1966

3,256,081
MANUFACTURE OF FLAT GLASS
Ivan Peyches, Stéphane Dufaure de Lajarte, and Bernard Laurent, Paris, France, assignors to Compagnie de Saint-Gobain, Neuilly-sur-Seine, France
Filed Nov. 19, 1963, Ser. No. 324,748
Claims priority, application France, Apr. 24, 1957, 737,054, Patent 1,171,875
6 Claims. (Cl. 65—184)

This is a continuation-in-part of application No. 730,107, filed April 22, 1958, now U.S. Patent No. 3,148,046, dated September 8, 1964.

This case relates to the manufacture of flat glass and particularly to the continuous production of glass sheets by casting glass in one or more layers in a plastic state. As heretofore produced by casting and cooling, such sheets have surfaces not free of irregularities and not perfectly plane, so that they have to be ground and polished if their surfaces are to be plane, smooth, and of polished aspect.

Even when one succeeds in getting a sheet of glass that is apparently plane and of polished aspect in the natural state, there are still visible defects which arise from a juxtaposition of surfaces at different levels, usually of small amplitude and large radius of curvature. These defects have the inconvenience of deforming the images by reflection and transmission. In such case the product has an unsatisfactory appearance compared to glass, such as plate glass, which is produced by grinding and polishing.

Glass sheets have a natural surface when they have been produced without the aid of tools. Thus, window glass has a natural surface as it is lifted out of the forming machine and cooled, but, if the glass is ground, that natural surface is removed, and another surface is applied by polishing, producing a finish which is superior but not natural. Natural surfaces have been subject to various disadvantages and have generally been quite inferior to polished surfaces.

It is an object of this invention to prepare flat glass with a natural surface which is plane and of polished aspect. This is particularly important in glass of the type called opal glass which is opaque or colored, and used for coatings for walls, revetments, table tops, and so forth, and requires a plane and polished aspect because of its use. These glasses must be free from defects deforming the images seen by reflection, especially those resulting from juxtaposition of surfaces of the order of about one cm.$^2$ which are at levels differing on the order of a few hundredths of a mm. These defects give the impression that the sheet has been marked as is hammered metal and are called hammering.

Another object is to eliminate at least a substantial part of the operations of grinding and polishing which add materially to the cost of the product.

Another object is to increase the quality of natural flat glass.

We have discovered that the above mentioned defect, called hammering, occurs if a noticeable gradient of temperature exists between the two faces of the sheet of glass and on the length of the sheet during cooling within a particular zone of temperature which lies between about 800° and 600° C. for usual glasses which serve for the manufacture of opal glass, temperatures which correspond to a viscosity range of about $10^5$–$10^{10}$ poises. It is, therefore, an object of this invention to cool the glass within this range of temperature and viscosity in such a way that hammering does not occur.

The glass being relatively fluid in this range, the differences of viscosity in the glass, which result from differences in temperature between adjacent regions, make the contraction of the glass during cooling irregular and introduce the hammered effect.

The objects of the invention also include novel apparatus for carrying out the novel process. Among the objects of the invention pertaining to apparatus are an improved means of forming and distributing a glass sheet. Another object is an apparatus for controlling the viscosity of glass in bulk through the steps of forming and distributing the sheet upon a support. Another object is to provide apparatus of movable type for the reception of glass sheet and for the control of temperature during cooling. Another object is to maintain a moving, plane bed for the reception of glass. Another object is a novel spreader or distributor of hot glass. Another object is to make more perfect laminated sheets having two or more adherent layers.

The objects of the invention are accomplished, generally speaking, by cooling the sheet of glass from a viscosity of about $10^5$ poises to a viscosity of $10^{10}$ poises at such a rate that no marked difference in temperature exists in adjacent regions of the glass during the cooling in this range, particularly avoiding any marked differences in temperature between adjacent regions as the glass passes through the viscosity of $10^{10}$ poises. But it is to be noted that the temperature corresponding to a particular value of viscosity is not the same for glasses of different compositions. Then, the temperatures corresponding to viscosities of $10^5$ and $10^{10}$ poises for a particular glass would have to be determined from the curve giving the viscosities of said glasses plotted against temperature.

In the majority of cases, the temperature gradient between adjacent regions which is permissible as the glass enters the range corresponds to a ratio of viscosity which should not be greater than $10^2$, the maximum viscosity being then for example $10^5$ poises on one face of the sheet of glass and the minimum viscosity being $10^3$ poises on the other face. This ratio of viscosity should be reduced progressively as the sheet is cooled until it is no more than a few units at the end of the range, the minimum viscosity then being, for example, $10^{10}$ poises on one face and the maximum viscosity being $10^{10.5}$ poises on the other face. The cooling should preferably be conducted so that the viscosity should not more than double itself per minute.

An increase of the cooling rate leading to an increase of the viscosity greater than the doubling per minute defined above would tend to produce transverse waves in the glass sheet and a temperature gradient from one face to the other of the sheet giving a viscosity ratio greater than $10^2$ would lead to hammering defects on the faces of the sheet.

Thus, the invention leads to control the cooling of the sheet of glass with superior precision in a range corresponding to viscosities much lower than those corresponding to the region between the upper annealing point of $10^{13.4}$ poises and the strain point of $10^{14.6}$ poises, which was heretofore the range in which the cooling of the glass was carefully controlled in order to produce annealing.

In the modern practice of making tempered glass, the glass is heated to softening temperature and viscosity, $10^{11}$–$10^{12}$ poises, and is blasted with cold air until it can be handled, a very violent cooling. In the modern practice of annealing, glass is cooled rapidly but not violently to the upper annealing point of $10^{13.4}$ poises; it is then cooled slowly to the lower annealing point of $10^{14.6}$ poises; after this is past it may be cooled with regard to nothing but fugitive strains.

These are the two existing processes of cooling which are now in standard use. Neither of them has any effect on hammering.

The present invention adds a third cooling treatment by means of which the appearance of natural glass is improved, its surface is made superior, and the prior defect of hammering is substantially eliminated.

In the practice of the invention, the glass sheet may be cast on a horizontal mobile support which is thermally insulating and which is at about the same temperature as the sheet as it is deposited. The casting preferably occurs in an enclosure which is also at the same temperature. Thereafter the sheet is passed through zones of decreasing temperature from a temperature corresponding to the viscosity of $10^5$ poises until it reaches a viscosity of $10^{10}$ poises. During this phase of the cooling the glass rests on a heat-insulating support and is in a chamber of which the temperature is controlled so that the loss of calories by convection through the lower face of the glass can be kept approximately equivalent to the loss by radiation and convection from the upper face. It is possible to cool a face of the sheet more than the other face but without producing a temperature gradient between the two faces corresponding to a viscosity ratio greater than $10^2$ during the first cooling phase and a few unities greater at the end of the cooling. There is thus avoided any excessive difference in temperature between the exterior and the interior of the sheet, provided that its rate of travel through the regions of decreasing temperature is sufficiently slow. This rate will be adjusted to compensate for sheets of different thickness.

For example, it has been established that in order to produce a sheet 5–7 mm. thick from a particular kind of soda-lime glass containing a small proportion of boron, which is particularly useful for making revetments in building construction, the reduction of temperature from 800° to 600° C., which corresponds to the range of viscosity between $10^5$ and $10^{10}$ poises, should take 20 minutes. Under these conditions, this glass has an un-hammered surface, is of uniform thickness, and is plane, and all of its original perfection will be preserved without hammering, including its plane surface. For soda-lime glass sheets having a thickness of 3 to 7 mm. good results were obtained with rates of travel between 10 and 40 cm. per minute; in these cases the reduction of temperature from 800° to 600° C. was attained on a travel of a few meters, for example, 3 to 8 meters according to the rate of travel.

It is to be understood that the slow cooling in the temperature range of this invention may be followed by annealing, according to customary practice, in the annealing range which begins at $10^{13.4}$ poises, or by other heat treatment such as tempering or by a brief intense heating as described in French Patent 1,036,011 of April 21, 1951.

It is already known how to cast a sheet of glass and any such casting means may be employed in this case. However, it is important that the sheet should be of reasonably uniform temperature through its whole thickness as it enters the novel range at viscosity of about $10^5$ poises.

In the initial casting, the glass should have an initial temperature high enough to have good fluidity and levelling power, so as to produce by itself, by subsidence, a plane surface and regular thickness on the support. The glass sheet thus produced has an upper face which is of polished aspect due to the fact that the face is actually formed out of contact with any instrument, even though it may have been discharged from the furnace through an instrument, the actual formation of the face occurring after contact with the pouring or casting instrument has been terminated. For all glasses, good leveling power is possessed by the glass at viscosities about $10^2$–$10^3$ poises. For soda-lime glasses of the type which we have used in the example cited above the temperature corresponding to this viscosity is about 1100° C. This value of the temperature may differ somewhat for glasses of different constitution but is readily determinable from the curve of viscosity of the glass.

According to one method of carrying out the invention, this leveling of the glass is attained by placing the casting apparatus and the support, on which the glass is poured, in an enclosure which is at about the same temperature as the glass. By adjusting the temperature of this enclosure, the fluidity of the glass can be controlled so as to produce a sheet having the surface perfection which is sought.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a diagrammatic elevational view partly in section of an apparatus according to the invention;

FIG. 2 is a diagrammatic plan view thereof, line 2—2 of FIG. 1;

FIG. 3 is a diagrammatic view partly in section, in different scale, on line 3—3 of FIG. 4;

FIG. 4 is a diagrammatic elevational view partly in vertical section of an apparatus for making laminated glass by the invention;

FIG. 5 is a diagrammatic view partly in vertical section of a modified apparatus for making laminated glass;

FIG. 6 is a perspective view of a novel casting apparatus;

FIG. 7 is a diagrammatical, elevational view of the apparatus for screening and returning the sand of the bed for reuse;

FIG. 8 is a perspective view of the bed-forming apparatus; and

Figure 9:
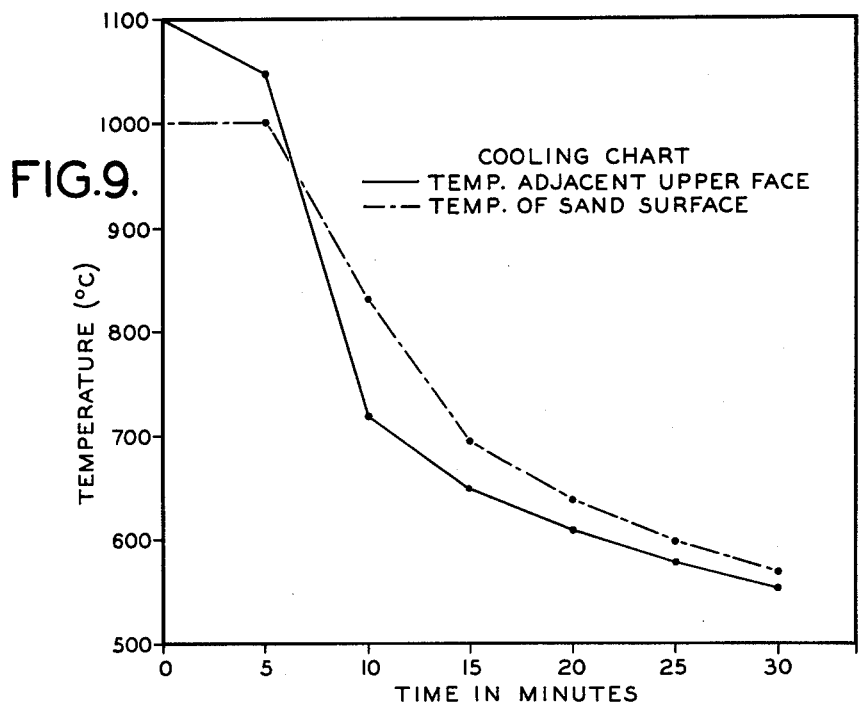
FIGS. 9 and 10 are cooling and viscosity diagrams.

In the drawings, 10 represents a device for supplying molten glass to the apparatus of the invention. It is represented as a reservoir tank supported by wheels 11 on rails 12 above the apparatus for casting the sheet. A cap 13 gives access to the interior of the reservoir 10, permits it to be filled with molten glass from a furnace, and permits a drainage tube 14 to be inserted in an opening 15 in the sole of the reservoir and an opening 16 in the top of the chamber 31 which encloses a slotted delivering trough 17, through the slot of which a sheet of glass is cast. The tube 14 has a sealing fit with hole 15 and sufficient length to extend above the level of the glass in the tank 10 when the tank is full and the tube is lifted up out of discharge position to a position in which it does not project below the sole of the tank. In that position it seals the hole and allows the tank to be moved over the rails 12.

In the invention of FIG. 1, the glass is received upon the top of a prepared surface which moves at the same rate at which the glass sheet is cast. The prepared surface is supported on an endless belt 18 which runs around rollers 19, 20 which keep it taut in any of the ways which are employed for that purpose. The belt itself may be made of steel and may be comparable to the type which is used in the annealing lehr for bottles. Another set of rollers 21, 22 supports an endless web of fabric 23, such as asbestos or the like, which is impermeable to granular materials and resistant to heat. Between rollers 19 the belt 23 lies on the surface of the belt 18 and supports a bed of a heat resistant granular material.

A trough 25, an elongated, slotted funnel, contains and is supplied with a heat-insulating material, such as sand, and delivers it as a layer 40 in even thickness across that part of the belt and fabric which is to receive the sheet of glass. Another trough 26 contains a heat-insulating material which is preferably finer and hotter, which it disposes upon that which was deposited by trough 25. A roller 27 levels the layers, so that the upper surface of the prepared bed is planar.

In the preferred form of the invention, a trough 28 delivers an even layer of fine powder to the top of the bed thus prepared, and it is this layer which receives the glass sheet cast by trough 17 in compartment 31. The trough 17 is composed of refractory material or metal and has an elongated opening with parallel edges which are very close to the surface of the prepared bed so as to prevent the formation of undulations or the inclusion of bubbles in the cast sheet. The tube 14 may be of platinum and, as the lower end of the tube is inside the trough 17, the flow of glass from the trough is independent of the level of glass in the reservoir 10. The tube 14 is provided with a heating element 30 (FIG. 3) of electrical-resistance type, which is interposed between the sole of the reservoir and the top of the casting chamber, or the tube 14 may be heated by the passage of an electrical current through it, in order to prevent cooling of the glass during its journey to the casting trough 17. The heating of tube 14 enables it to deliver glass to the trough at any selected temperature. The casting trough 17 is placed in a casting chamber 31 which encloses that part of the mobile support 18 onto which the sheet of glass is fed. This enclosure is kept at a temperature near that of the glass supplied to trough 17, so that the glass begins to level itself as soon as it is cast. The surface of the support, the prepared bed, arrives in the enclosure 31 at about the same temperature as that of the glass, due to heat control effectuated in a chamber 32 in advance of chamber 31 which is heated by resistors 33 or other appropriate heating means. The temperature in chamber 31 may be maintained by heating means such as resistors 34. The temperature of the glass as it is spread on the prepared bed is such that the glass is self-leveling.

The sheet of glass 35, having subsided to a plane surface and a polished aspect, issues from the isothermal chamber 31 on the prepared bed into a tunnel 46 which is insulated and locally heated to progressively decreasing temperatures by heating means such as resistor groups 36, 37, 38, 39. The electrical power fed to each group of resistors is controlled in order to obtain a gradual loss of temperature between 1000°–1100° C., which is the temperature of chamber 31, and 500° C. which is the temperature of discharge. This progressive reduction is used to accurately control the cooling of the sheet in chamber 46' between 800° and 600° C. (for ordinary soda-lime glasses) so as to obtain between the upper and lower faces a ratio of viscosities which is not greater than $10^2$ in the vicinity of the upper temperature (about 800° C.). This ratio decreases as the glass approaches the lower temperature. In case this cooling tunnel is insulated to produce a gradual loss of temperature, the heating means may not be used. Otherwise, the temperature can be controlled as indicated in the drawing. By this means the sheet progressively passes from the viscosity $10^5$ to $10^{10}$ poises without hammering the plane and polished upper surface.

As another example of the invention, opaline glass having the composition $SiO_2$ 57.60% by weight; $SO_3$ 0.07%; $Fe_2O_3$ 0.07%; $Al_2O_3$ 11.33%; $CaO$ 8.20%; $MgO$ 0.10%; $BaO$ 0.13%; $Na_2O$ 13.56%; $K_2O$ 0.06%; fluorine 3.38%; oxygen corresponding to the fluorine 1.4%; and $B_2O_3$ 6.51%, a known glass made from a batch constituted of:

| | Kg. |
|---|---|
| Sand | 280 |
| Sodium carbonate | 88 |
| Dehydrated borax | 55.5 |
| Sodium nitrate | 9.8 |
| Fluor spar | 62 |
| Hydrated alumina | 86 |
| Arsenious anhydride | 2 | was cast as indicated at the left end of FIG. 5 and, after deposition on a bed like that of FIG. 1, was carried through a tunnel wherein its cooling rate was established, by apparatus like that of FIG. 1, as follows:

| Minutes of time | Temp. at upper surface of glass, °C. | Viscosity in poises corresponding to Temp. of 2nd column | Temp. of sand contacting glass in °C. | Viscosity in poises corresponding to Temp., 4th column | Ratio of Viscosities |
|---|---|---|---|---|---|
| 0 | 1,100 | $5.7 \times 10^2$ | 1,000 | $1.8 \times 10^3$ | 0.3 |
| 5 | 1,050 | $9 \times 10^2$ | 1,000 | $1.8 \times 10^3$ | 0.2 |
| 10 | 720 | $4 \times 10^6$ | 830 | $5 \times 10^4$ | 80 |
| 15 | 650 | $7 \times 10^8$ | 695 | $2 \times 10^7$ | 35 |
| 20 | 610 | $10^{10}$ | 640 | $10^9$ | 10 |
| 25 | 580 | $2 \times 10^{11}$ | 600 | $2.5 \times 10^{10}$ | 8 |
| 30 | 560 | $10^{13}$ | 570 | $5 \times 10^{12}$ | 2 |

The temperature above the sheet was allowed to fall in 5 minutes from 1,050 to 720° C. but the fall was slower at the support as the sand cooled more slowly. The first five minutes was spent in the isothermal zone 31, where the glass attained equilibrium and levelled itself. The real temperatures of the upper and lower faces of the sheet were between the adjacent values of the table. The viscosity ratios of the table express the upper limits of the deal viscosities of the upper and lower faces of the sheet at each station. The rate of cooling and the temperatures in the cooling tunnel were established so that, as a function of the amount of glass which passed per minute, the fall in temperature of the glass did not exceed, at any point, what corresponds to the doubling of the viscosity per minute. These figures are not taken from the glass by instruments but from the temperature-viscosity curves of the glass. That for the opaline of this example is as follows.

Viscosity in poises:                 Temp. in ° C.

| Viscosity in poises | Temp. in °C. |
|---|---|
| $3.10^2$ | 1,140 |
| $5.10^2$ | 1,100 |
| $7.5.10^2$ | 1,065 |
| $10^3$ | 1,045 |
| $2.10^3$ | 995 |
| $3.10^3$ | 970 |
| $5.10^3$ | 930 |
| $7.5.10^3$ | 915 |
| $10^4$ | 900 |
| $3.10^4$ | 855 |
| $10^5$ | 805 |
| $10^6$ | 745 |
| $10^7$ | 705 |
| $10^8$ | 670 |
| $10^9$ | 640 |
| $10^{10}$ | 610 |
| $10^{11}$ | 585 |
| $10^{12}$ | 565 |
| $10^{13}$ | 540 |

This produced, in about 20 minutes, a reduction in temperature from 805° C. to 610° C. in which range the viscosity is from $10^5$ to $10^{10}$ poises. The sheet moved at a rate of 10 cm. per minute. The support, of the type of FIG. 1 was at 1120° C., which, for this glass corresponded to a viscosity less than 500 poises as shown in the above table. After the glass had attained $10^{10}$ poises it was annealed by standard methods.

The glass had a fire polished surface free from hammering.

The temperature range of the new control zone differs somewhat for different glasses, but is readily determinable with exactitude by comparison of temperature-viscosity tables and simple tests to establish the exact upper and lower limits. The conditions are best expressed in terms of viscosity because it is relative viscosity in adjoining parts of the glass which causes hammering. Thus, to take a sheet from $10^5$ poises to $10^{10}$ poises without exceeding the double of the viscosity per minute one may go by increments as follows in the case of another example of glass for which the following temperatures correspond to the following viscosities:

| | °C. |
|---|---|
| $10^5$ poises | 800 |
| $4 \times 10^5$ poises | 760 |
| $1.6 \times 10^6$ poises | 730 |
| $6.4 \times 10^6$ poises | 700 |
| $2.5 \times 10^7$ poises | 680 |
| $10^8$ poises | 655 |
| $4 \times 10^8$ poises | 630 |
| $1.6 \times 10^9$ poises | 610 |
| $6.4 \times 10^9$ poises | 600 |
| $1.3 \times 10^{10}$ poises | 580 |

From one line to another the viscosity quadruples, so that, to pass from one line to another ought to take at least 2 minutes, or 18 minutes between 800° C. and 580 C. Thus, using the opaline glass of the example above, one should regulate the gradient of viscosity so that it does not exceed 100 poises between the opposed faces of the sheet and so that the viscosity does not exceed the double of itself in any minute of cooling in this critical range.

The prepared bed is of material importance in accurately controlling the fall in temperature within the range of the invention and is of novel constitution. It contains a bottom layer of refractory material 40 (FIG. 3), for instance sand, the grain size of which permits easy packing and leveling. The thickness of this layer may be on the order of 10 cm., which is enough to thermally insulate the endless belt on which it rests so that it does not exceed a relatively low temperature, such as 150° C., and prevents excessive expansion and contraction. The bed 40 may be glassmaker's sand having a grain size less than about 0.25 mm., and of which 80% has a grain size superior to about 0.15 mm. Above the layer 40 it is desirable to deposit an intermediate layer 41, several tens of millimeters thick, of a finer product, to prevent contact of the lower face of the glass sheet with sand grains of the larger size, which would cause difficulties during annealing or during the cutting of the sheet. This layer in the preferred form receives a top layer of pulverized product 41' which may be chamotte (grog) having a grain size not over 0.1 mm. This makes the surface practically impermeable to the glass. In addition, when attached to the lower face of the glass, it constitutes a very thin packing which is not harmful during annealing and cutting. Furthermore, when a glass sheet is used as a revetment, this scanty coating facilitates the placement of the glass on the wall. The endless belt 18 is covered with an endless sheet 23 which is impermeable to the granular material and may be composed of various heat resistant materials, of which glass fibers or asbestos are exemplary. The problem of maintaining the belt 18 in a level position has been solved in the papermaking industry and presents no problem here.

The glass is kept on the moving prepared bed until its temperature has been reduced enough to lower the viscosity of the sheet below $10^{10}$ poises, after which it is passed on to rollers 45, still in the same tunnel 46 which has enclosed the sheet since it passed out of the isothermal chamber 31. The sheet can be further treated in the tunnel, as explained above. It will be assumed, looking at FIG. 1, that the sheet has passed through the point of $10^{10}$ poises about as it reached the roller 19.

The prepared bed is separated as shown in FIG. 7, after it leaves the glass sheet, into a hot upper layer 80 and a cooler lower layer 81. A metal plate 82 accomplishes the separation. The cooler sand 81 is received on a plate 83 and then on a screen 50 which extracts gross particles, the dust passing onto a conveyor 85 which returns it to hopper 28, as indicated in FIG. 1 by dash and dot line 48. Another conveyor 85' mixes the layer particles with the intermediate product for hopper 26.

The hotter sand 80 flows onto screen 86 and is separated into a coarse fraction 87 and an intermediate fraction 88 which are carried by conveyors 89, 89' to hoppers 25, 26, respectively. As indicated in FIG. 1 the return indicated by lines 48, 49, is to a screen 50 and the trough 25 respectively. The screen 50 separates the very fine grains from all coarser grains, the latter being directed as desired, for instance to trough 26 and to trough 28 for reuse in reconstruction of the prepared bed. Any handling means that is well known can be used for this purpose. An initial separation of dust from the top of the prepared bed can take place by means of a vacuum-type dust catcher 51, and this dust may also be returned to hopper 28. The roller 27 packs the layers deposited by hoppers 25, 26 and provides a firm and level surface upon which the light material from trough 28 lies as a thin blanket. The prepared bed as thus reconstituted especially the upper part of it, is heated again in chamber 32.

It will be observed in FIGS. 3 and 8 that scraping devices give the borders of the prepared bed a slope at an inclination of rest, and that the inner corners $x$ of the side walls 52, 53 of the tunnel 46 enter these borders and form a thermal seal which retains the heat in the tunnel. FIG. 8 which is partly in section illustrates the means of levelling the bed and its construction. The hoppers 25, 26 deposit the coarse sand 40 and the finer sand 41 on the fabric 23 which covers the metallic screen 18. A roller 27 is mounted on bearings 271 and serves to level the upper surface of the bed. The roller may be driven or not, and it depresses the bed on which the sheet is to be laid below the shoulders 27'. Oppositely disposed scrapers 90 are mounted outside the roller and cooperate with the ends of the roller to shape the shoulders, as shown in FIG. 8 at 91. A brush 54 acts to remove attached particles from the bottom of the glass sheet and another vacuum cleaner 55 removes any adhering particles by suction.

FIG. 4 represents an apparatus for making a sheet of laminated glass, and it specifically illustrates the lamination of different kinds of glass, a lower layer 60 of clear glass and an upper layer 61 of opal glass. These glasses should have approximately the same coefficient of expansion. The two layers are deposited, one above the other, on the moving prepared bed in the isothermal chamber 31 from a plurality of glass reservoirs 10, one of which is not shown, by means of casting devices of different type than that disclosed in FIG. 5. Both types are useful, that of FIG. 4 being of fall type, and that of FIG. 5 being of slot or nozzle type.

The casting devices of FIGS. 4 and 6 are new and useful. They have a flat or slightly crowned spreader plate 100 from which rises a back flange 101 and from which depends a feeding ramp or skirt 102. The tube 14 deposits the molten glass on the spreader plate, its upstream flow is stopped by the backing plate and it flows evenly toward the skirt. The lip 103 of the skirt is curved (FIG. 6) or not (FIG. 4) as desired. The curvature may be circular with the tube 14 as a center, to insure even flow toward the lip 103, or it may be of any shape which will contribute to distribute the glass as desired. The pitch of skirt 102 is steep enough to insure even flow and to permit the glass to thin itself out as it approaches the bed (FIG. 4). The lower edge of the skirt is shown in a plane parallel to the bed (FIG. 6). The distributor will ordinarily approximate the width of the cast sheet, but for some uses may be greater or less. The spreader may be made of refractory metal, or the glass tank type refractories, or of graphite. It is supported by any satisfactory means, preferably on a universal mount.

FIG. 5 shows another modification for manufacturing a laminated sheet, wherein the lower sheet 72 is rolled between rollers 70, 71 in the free air and deposited upon the prepared bed, before it enters the preheating chamber 32. The rolling apparatus could also be placed within chamber 32 or within chamber 31 in order to avoid cooling of the glass in open air. From that chamber 32 the glass sheet 72 is carried in to chamber 31, and, due to its passage through the preheating chamber 32, is substantially at the same temperature as the second sheet 73 deposited on it in chamber 31. In this way, the levelling and the solidifying of the second sheet are carried out under conditions which conform to the present invention and result in a sheet having a natural, polished unhammered surface. This second layer can be of the same or of different glass than the first layer. These layers are cast at a temperature at which they are self-laminating and are laminated before they leave the hot zone of the furnace and travel as a unit 74 into the cooling tunnel 46.

In operation the tank 10, the walls of which are maintained at the casting temperature of the glass, is filled from the furnace, the tube 14 being raised to position which prevents discharge but which seals the opening in the bottom, and is run on the rails to a position centrally over the heating unit 30. The tube is then moved downwardly through the opening 16 until it is in position to supply the feeder 17 with glass. Discharge of the glass into the feeder begins as soon as the upper end of the tube is below the level of the glass in the tank. The feeder, 17 in FIG. 1, extends the full width of the sheet which is to be cast and forms the sheet as the glass progresses through the slot in its bottom. The slot is carefully machined to be of uniform width and the sheet is consequently of uniform thickness as it is applied to the moving bed in chamber 31. The heater 30 is maintained at such temperature that the glass in the tank is kept at satisfactory casting temperature, by conduction from the heater, and the glass which flows through the tube 14 is brought to uniform temperature as it passes through the heater so that the temperature of the glass which is discharged into the casting trough 17 is at uniform temperature.

The bed as shown is made by depositing a layer of coarse sand 40 from hopper 25, a layer of intermediately size sand on top of the glass from hopper 26 and a layer of sand in a form of microscopic dust on top of the intermediate layer from hopper 28. The roller 27 establishes a plane surface which is not disturbed by the fall of fine material from hopper 28. If need be, the further levelling may take place at the up stream end of the tunnel 46.

The first chamber, 32, of the tunnel is maintained at a temperature which would produce a viscosity $10^4$ to $10^2$ poises so that the upper surface of the bed as it progresses into chamber 31 is at a temperature which will not cause a change in the viscosity of the glass which flows out of the feeder 17. The temperature in this chamber is maintained by means of heaters 34 at a level which permits the subsidence of the glass to a state of equilibrium between the forces of surface tension and gravity to occur before the glass leaves the chamber with the production of a fire polished surface. When the glass enters the tunnel 46 its temperature is controlled in the manner which has been described in detail hereinabove with special attention to the rate of cooling in that region where the glass has a viscosity between $10^5$ and $10^{10}$ poises. After this region has been passed the cooling may proceed as in ordinary annealing.

Several methods of casting the glass have been illustrated. The first method has already been described in connection with FIG. 1. A second method is shown at the left end of FIG. 5, wherein the glass flows from a furnace to shaping rollers 70, 71 and is distributed by them upon the moving bed. Another method is shown in FIGS. 4 and 6. In that method the glass is allowed to accumulate upon and flow over the surface of a plate until it reaches a skirt by which it is deposited upon the bed. In this type of casting apparatus uniformity of distribution can be affected and achieved by several methods, by attention to the curvature of the lip 103, by attention to the inclination of the skirt 102, by attention to the position of tube 14 with respect to the skirt, by attention to the curvature of the backing plate 101 and by attention to the crown of the distributor plate 100. This apparatus is especially satisfactory when it is employed in a uniformally heated chamber such as 31. It is simple and effective and has certain advantages over known types of casting devices, especially because of its simplicity, because it has no moving parts, and because it is readily adjusted in position and replaced when necessary.

It will be perceived from the modifications and illustrations given that various arrangements of apparatus and process steps can be adopted to carry out the laminating process.

According to another modification of the process, one may deposit on the support a sheet of glass, of which the surface and viscosity are of any chosen viscosity; the glass may even be in the solid state or only slightly plastic, being raised in the isothermal chamber itself to the temperature necessary to permit it to flow by gravity and surface tension to produce a fire polished surface and thereafter to be cooled without hammering. Thus, imperfect pieces can be perfected by passage through the apparatus.

Glasses will flow by gravity and will subside when the viscosity is between $10^4$ and $10^2$ poises, and in this range of viscosity will themselves develop a plane surface having a polished aspect, substantially free from hammering. The casting of the glass in this viscosity range produces an initial fire polish and an unmarred surface. The hammering has been introduced by the subsequent treatment of the prior art, which this invention has remedied, producing better glass.

Among minor variants in the apparatus are the use of a plurality of tubes 14 to secure equal distribution of the glass in the casting trough, or to provide means for moving a single tube 14 from place to place across the width of the chamber 31 and the glass reservoir 10. In lamination, glasses of different types, types differing in color, composition opacity or in any other way, can be successfully laminated with the production of a plane and unhammered face, provided only that they have similar degrees of expansion and contraction.

The casting process produces a glass having one plane surface of polished aspect substantially free of hammering.

Another advantage of the invention is in the discovery of this new and important range of viscosity between about $10^5$ and about $10^{10}$ poises and its efficacy in controlling the surface condition of the sheet.

A particular advantage of the invention is the production of a surface on flat glass by natural subsidence which is plane and substantially free of differences in level and other irregularities which produce visible imperfections in the surface.

It can also be applied to standard methods of drawing glass. In all such cases the sheet, after formation, is subjected to controlled cooling in the range between $10^5$ and $10^{10}$ poises as described herein.

Figure 10:
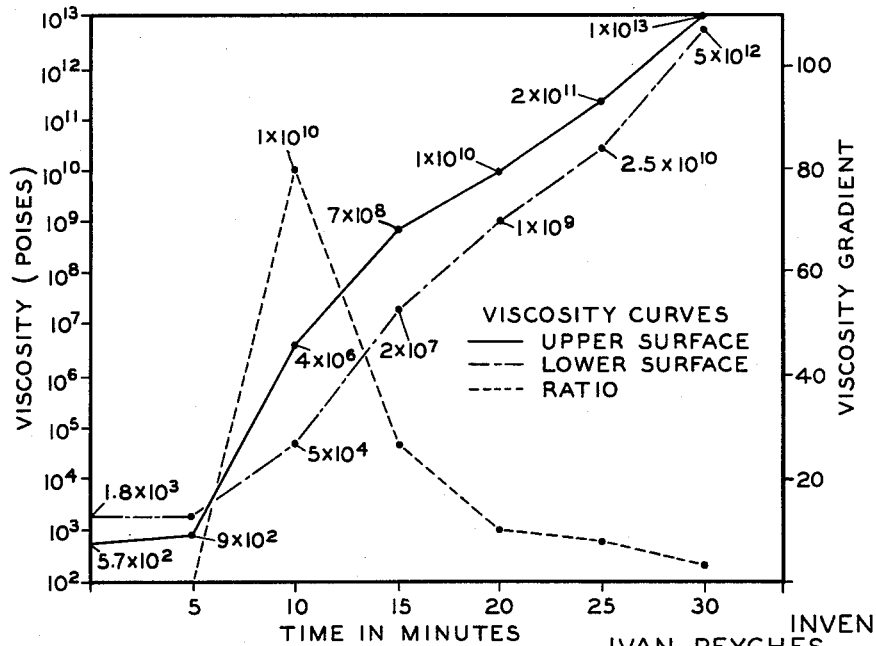

FIGS. 9 and 10 relate to the cooling and viscosity cycles of the opaline glass which has been used for the exemplification of the process. FIG. 9 shows the temperatures which exist just above the sheet and the temperatures of the sand support just under the sheet in the same locations, the temperature of the sheet against the sand being higher than that of the upper surface of the sheet.

Other advantages are the production of sheets having naturally a fire polished surface which is free of tool marks and a rugose face due to the contact with the powdered bed, thus rugosity, when the sheet to be used as a wall-coating insuring greater facilities for its fixation to the wall.

As many apparently widely different embodiments of

What is claimed is:

1. Apparatus for the casting of molten plastic sheet upon a conveyor of variable speed having means to form a bed of finely divided thermal insulation thereon, including a conveyor, means to form a particulate bed thereon, means to heat the surface of the bed to a temperature approximating that of the plastic to be cast, a container for molten plastic above the hot bed, an enclosure between the container and the moving bed, plastic delivery means extending from the container into the enclosure, plastic receiving and sheet-forming means in the enclosure arranged to receive plastic from the delivery means, to shape the plastic sheet and to deposit it on the bed, means to heat the enclosure containing the sheet-forming means to a selected casting temperature, and means to reduce the temperature of the cast plastic sheet progressively on the moving bed including heating means of progressively reduced temperature disposed along the path of the mobile support.

2. Apparatus according to claim 1 in which the molten plastic is glass and the apparatus is constructed and arranged of materials and parts adapted to handle it, including heating means to establish a viscosity of the glass at casting of about $10^3$ poises, and heating means to increase the viscosity of the glass in the range from about $10^5$ to about $10^{10}$ poises by progressively reducing its temperature in coordination with the speed of the sheet to produce an increase in viscosity not greater than the double of the viscosity per minute.

3. The apparatus of claim 2 in which the sheet-forming means comprises a slotted trough positioned to receive the glass from the delivery means and to deliver it to the conveyor.

4. The apparatus of claim 2 in which the sheet-forming means comprises a spreader plate which is disposed beneath the delivery means and is provided with a feeding ramp approaching the conveyor.

5. The apparatus of claim 1 in which the container is spaced from the enclosure and the delivery means passes through the said space, and variable heating means is disposed in the said space contiguous to the delivery means.

6. The apparatus of claim 1 in which the conveyor means is a foraminous and metallic belt, heat resistant fabric covers the belt, and the bed forming means includes means to form a lower bed of coarse granules of the insulation on the fabric covered belt, means to form thereabove a surface of fine granules of the insulation, means to gather and separate the grains of said bed into their respective sizes as they are discharged from the belt, and means to distribute the sized grains to the bed forming means as aforesaid.

References Cited by the Examiner

UNITED STATES PATENTS

| | | | |
|---|---|---|---|
| 1,469,383 | 10/1923 | Crowley | 65—90 |
| 1,603,974 | 10/1926 | Mullholland et al. | 65—33 |
| 1,620,207 | 3/1928 | Howard | 65—127 |
| 1,673,907 | 6/1928 | Ferngren | 65—325 X |
| 1,698,491 | 1/1929 | Brasseur et al. | 65—121 |
| 1,759,229 | 5/1930 | Drake | 65—325 X |
| 1,884,926 | 10/1932 | Van Ness | 65—23 |
| 1,889,891 | 12/1932 | Favre | 65—325 X |
| 3,083,551 | 4/1963 | Pilkington | 65—65 |
| 3,148,046 | 9/1964 | Peyches et al. | 65—95 |

FOREIGN PATENTS 25,042  10/1908  Great Britain.

DONALL H. SYLVESTER, *Primary Examiner.*

DANIEL CRUPAIN, *Assistant Examiner.*